(12) United States Patent
Han et al.

(10) Patent No.: US 11,329,800 B2
(45) Date of Patent: May 10, 2022

(54) PROOF OF DYNAMIC QUORUM FOR BLOCKCHAIN CONSENSUS

(71) Applicant: LendingClub Corporation, San Francisco, CA (US)

(72) Inventors: Hyunsuk Han, San Ramon, CA (US); Jayakrishnan Nair, San Ramon, CA (US); Amitkumar Tank, Union City, CA (US); Srinivas Ambikapathi, Fremont, CA (US)

(73) Assignee: LendingClub Bank, National Association, Lexi, UT (US)

(*) Notice: Subject to any disclaimer, the term of this patent is extended or adjusted under 35 U.S.C. 154(b) by 253 days.

(21) Appl. No.: 16/658,118

(22) Filed: Oct. 20, 2019

(65) Prior Publication Data

US 2021/0119768 A1   Apr. 22, 2021

(51) Int. Cl.
*H04L 29/06* (2006.01)
*H04L 9/06* (2006.01)

(52) U.S. Cl.
CPC .......... *H04L 9/0637* (2013.01); *H04L 9/0643* (2013.01); *H04L 2209/38* (2013.01)

(58) Field of Classification Search
CPC . H04L 2209/38; H04L 9/0637; H04L 9/0643; H04L 63/12; H04L 9/3239; H04L 63/123
See application file for complete search history.

(56) References Cited

U.S. PATENT DOCUMENTS

2020/0220881 A1* 7/2020 Krishnamurthy ..... H04L 9/3239

* cited by examiner

*Primary Examiner* — Olugbenga O Idowu
(74) *Attorney, Agent, or Firm* — Hickman Becker Bingham Ledesma LLP (57) ABSTRACT

Proof-of-Dynamic-Quorum is a consensus mechanism for blockchain networks that selects a dynamic quorum of nodes to validate a proposed block based on digital data included in the proposed block. In an embodiment, a request to add a proposed block to a blockchain is received by a node of a blockchain network. A composite key value is generated based on one or more values within the proposed block. Based on a composite-key-value-to-quorum-participants mapping that is indicated in one or more blocks that are already present in the blockchain, a validating quorum is determined to determine whether the proposed block is to be added to the blockchain. When each node of the validating quorum indicates that the proposed block is accepted, the receiving node writes the proposed block to the blockchain. Proof-of-Dynamic-Quorum enables real-world authority data to be considered when performing a consensus algorithm in a blockchain network.

16 Claims, 3 Drawing Sheets

PROOF OF DYNAMIC QUORUM FOR BLOCKCHAIN CONSENSUS

TECHNICAL FIELD

One technical field of the present disclosure relates to improved methods, systems, computer software, and/or computer hardware in the field of distributed transaction computer systems. More particularly, the technology herein relates to techniques for determining which nodes in a blockchain network belong to a quorum that is to decide whether a proposed block is to be added to the blockchain.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Blockchain technology has been used in certain digital currency implementations. An example implementation and techniques are described in a 2008 article by Satoshi Nakamoto, titled "Bitcoin: A Peer-to-Peer Electronic Cash System". Other information about the structure, function and implementation of blockchain and distributed ledger software and computing systems is widely available in public sources.

Figure 1:
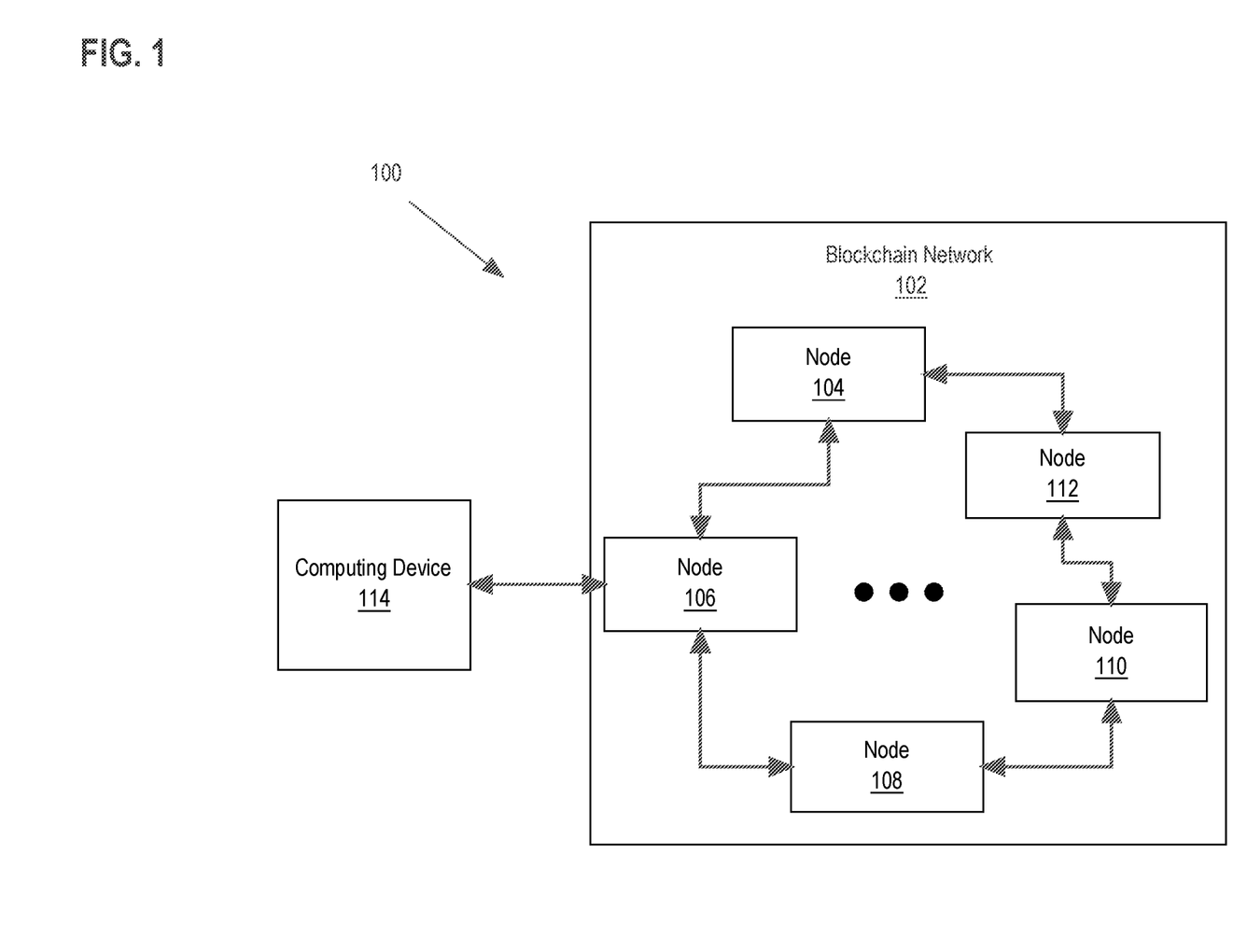
FIG. 1 depicts an embodiment of a blockchain network.

FIG. 1 depicts an embodiment of a blockchain network, which comprises a plurality of nodes 104, 106, 108, 110, 112 and may be implemented by a plurality of computing devices. Blockchain network 102 represents a computing environment for operating a decentralized framework that maintains a distributed data structure, which may be referred to herein as a secure distributed transaction ledger or a blockchain. This blockchain may support various functions, such as distributing computational tasks from one or more systems to one or more other systems, or interfacing and sharing data with other blockchains, among other functions.

To maintain the blockchain among the various nodes 104, 106, 108, 110, 112 in the blockchain network, a set of procedures are followed. Generally, such a network would suffer from inherent uncertainty and distrust between the nodes when they transact because they are typically unaffiliated with each other, may be transacting across vast distances, may be transacting anonymously, and because there is no centralized control or management to monitor or to resolve disputes. However, because the blockchain is maintained by each node in the blockchain network and because it is maintained according to set procedures that employ cryptographic methods and a consensus mechanism, the uncertain and distrust elements are mitigated.

Thus, the secure distributed transaction ledger, or blockchain, is a ledger maintained collectively by the nodes in blockchain network 102. The blockchain includes blocks with digital data regarding recent transactions and/or messages, linking data that links one block to its previous block in the blockchain, consensus data that ensures that the state of the blockchain is valid, and is endorsed by the majority of the record keeping systems. Furthermore, all confirmed transactions are included in the blockchain and are done so using cryptography. This way, the integrity and the chronological order of the blockchain are enforced and can be independently verified by each node.

Digital data may be received by one or more nodes in the blockchain network 102 for inclusion in the blockchain. This digital data is generally referred to as a "transaction" and is made available generally to the nodes in the blockchain network 102. One or more computing devices, such as a computer, mobile phone, tablet, or server may be configured to connect to the blockchain network to publish digital data to blocks of the blockchain.

Digital representations of assets can be created and stored in a block of a blockchain. The asset can represent virtually anything, from a digital document to a sailing boat. The digitial representation of an asset can be any value, or set of values, that uniquely identifies the asset. Each time any operation is performed involving an asset that is identified in a blockchain, the operation is recorded in a proposed block of the blockchain as a "transaction entry" and the proposed block is added to the blockchain. The operation may be, for example, a change in ownership of the asset.

For a given asset, the blocks of a blockchain may have transaction entries for changes to attributes of the asset, transfers in ownership of the asset, etc. Individual assets may be tracked on a single blockchain thoughout the lifetime of the asset, thereby enabling the history of the asset to be immutably stored, monitored, and verified by any interested entity.

When a transaction is initially received by a node, the node groups the transaction with other transactions into transaction entries of a proposed block. The proposed block is broadcasted to other nodes of the blockchain network according to a consensus algorithm. A consensus algorithm may be defined as the mechanism through which a blockchain network reaches consensus. Blockchains are built as distributed systems and, since they do not rely on a central authority, the nodes need to agree on the validity of transactions. Consensus algorithms ensure that consensus protocol rules are being followed and guarantee that all transactions occur in a trustless way.

A common consensus algorithm used in blockchain networks is a "proof-of-work" consensus algorithm. Proof-of-work consensus algorithms require providing an answer, also known as a proof, to a challenge that is hard to solve yet can be easily verified by a blockchain network in order for a node to gain the right to update a blockchain. Another common consensus algorithm used in blockchain networks is a "proof-of-stake" consensus algorithm. Proof-of-stake consensus algorithms run a lottery to choose a node to update a blockchain and award nodes with larger amount of stake (e.g. cryptocurrency) a higher chance of being chosen to update the blockchain. Yet another common consensus algorithm used in blockchain networks is a "proof-of-authority" consensus algorithm. A proof-of-authority consensus algoirthm is a modified form of proof-of-stake where instead of stake with the monetary value, a validator's identity performs the role of stake.

Existing consensus algorithms are effective for some applications, but currently have significant drawbacks. For example, proof-of-work consensus algorithms have a known issue of requiring heavy computing power to solve complex cryptographic puzzles therefore requiring heavy use of electricity which not only is costly but also not eco-friendly. Proof-of-stake consensus algorithms allow nodes with large amounts of stake a significantly higher chance of being chosen to update the blockchain, effectively deincentivizing small stake holders to participate in the blockchain network. Proof-of-authroity consensus algoirthms incorporate the concept of centralization and are often criticized since they defeats the purpose of blockchain being decentralized.

Additionally, existing consensus algorithms do not incorporate transaction data into their respective consensus algorithms when choosing a node or nodes to update a blockchain.

Based on the foregoing, it is desirable to provide a consensus algorithm that selects reliable nodes based on transaction data without incurring the drawbacks of prior consensus algorithms.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

General Overview

Techniques are described herein for implementing a Proof-of-Dynamic-Quorum ("PoDQ") consensus algorithm.

When a transaction is received by a node in a blockchain network, the node groups the transaction with other transactions into a proposed block. The node generates a composite key value based on one or more attribute values of a digital representation of an item in the proposed block.

The node then executes instructions to determine a validating quorum. The set of participating nodes to which a proposed block is sent is referred to herein as the "validating quorum". The members of the validating quorum are referred to herein as "quorum-participants". Each quorum-participant comprises a node of a blockchain network and may be identified by an identification value (ID) that is associated with a node of a blockchain network. Each quorum-participant is responsible for determining whether the proposed block is "valid", and therefore should be added to the blockchain.

The membership of the validating quorum is determined based on a composite-key-value-to-quorum-participants mapping that is indicated in one or more blocks of the blockchain. The composite-key-value-to-quorum-participants mapping is created or defined by a blockchain administrator and maps composite key values to nodes.

Once the validating quorum is determined, the proposed block is transmitted to the quorum-participants included in the validating quorum to accept or reject the proposed block. When all quorum-participants accept the proposed block, the node stores the proposed block in the blockchain.

PoDQ techniques discussed herein provide enhancements to consensus confirmation by utilizing real-world authority data, such as attributes of digital representations of items, to select custom validating quorums to determine the validity of proposed blocks. In other consensus algorithms, nodes that have no authoritative relation to real-world assets that are represented by digital data stored in a blockchain may be chosen to validate proposed blocks that include such data. PoDQ provides an additional layer of security to traditional blockchain implementations by filtering out nodes that have no authoritative relation to transactions included in proposed blocks and only allowing the most authoritative nodes of a blockchain network of nodes to validate proposed blocks that include specific attributes and attribute values.

Blockchain Transaction Data

Before a block is written to a blockchain, one or more transactions are received by a node of a blockchain network that maintains the blockchain and are grouped into a proposed block. In various embodiments, digital data included in a transaction and/or proposed block may comprise digital representations of items. Digital representations of items may include item identifiers and attributes of items. Digital representations of items are not limited to any specific category or domain.

A digital representation of an item may include multiple attributes. An 'item type' attribute may identify an item type such as a cryptocurrency, loan, legal doc, or car. An 'item status' attribute may identify a status of particular item type. For example, a proposed transaction with a 'car' item type may include an 'item status' attribute with possible values including ordered, manufacturing, manufactured, transmit, dealer purchased, purchased, leased, rented, totaled, inoperative. As another example, a proposed transaction with a 'loan' item type may have an 'item status' attribute with possible values including new, in guiding, rejected, issued, approved, default, charged off, closed. Attributes are not limited to any specific category or domain.

In various embodiments, when a proposed block is validated and recorded to a blockchain, the proposed block becomes a block of the blockchain. A proposed block or block may comprise one or more transaction entries. A transaction entry may comprise information regarding a transaction, such as items, groups, or corresponding hash-values for items or groups included in the transaction, and transaction data. The transaction data may comprise information or data about the transaction such as the entities included in the transaction and general information about the transaction. For example, a transaction entry may include an identification of a loan item that was sold or transferred from a seller entity to a buyer entity. The transaction data included with the transaction entry may include information about the details of a transaction such as the price the loan was sold for and information about the buyer entity and seller entity involved in the transaction.

In various embodiments, a block may comprise other digital data including a unique identifier of the sender of the data (or owner/originator/sender of the data). This information may be used for one or more purposes. For example, the identifier helps a device that reads the blockchain identify who published the data. The identifier of the publisher of the data also provides away by which a device can address a response to the sender, if desired. Additionally, the identifier of the owner/publisher may be used or linked to an account to pay for processing fees or other fees associated with using the blockchain as a communication channel, to perform computations, or other actions. Alternatively, a separate account identifier may be specified and used for payment purposes.

In various embodiments, digital data may include instructions, such as configuration data, management data, and/or instruction-related data, for nodes of the blockchain network. The digital data may include composite-key-value-to-quorum-participants mappings, as discussed herein. In embodiments, this data may be a link to the configuration data, management data, and/or instruction-related data, or may be the data itself. In embodiments, the configuration data, management data, and/or instruction-related data may be a program, a container, or a link to data. In embodiments, a link to a program may comprise a unique identifier or an address to a program in the blockchain, may be a link to an application or container available outside the blockchain, or a combination thereof.

Configuration and management data may specify that a blockchain is permissioned. In an embodiment, a blockchain comprises a permissioned blockchain that is accessible by authorized entities. The blockchain may prevent the publishing or storing information and/or data to a block of the blockchain if the identification information is not authorized. In a permissioned blockchain, users must be enrolled in the blockchain before they can perform transactions or store digital chain to a block of the chain. The enrollment process gives users credentials that are used to identify the user when he or she performs transactions such as reading from the blockchain and publishing to the blockchain.

Configuration and management data may also specify metadata indicating access control permissions for users of the blockchain. For example, access control permissions may determine whether a user is permitted to view or read information published to a particular block. Additionally, access control permissions included in the metadata of one block may determine whether a user is permitted to publish or store information to a next block.

Configuration and management data may also specify certain formats or types of data that is allowed to be written to a block in the blockchain. Configuration and management data may specify different types of items and corresponding data structure formats that are allowed to be written to a block of the blockchain. For example, configuration and management data stored in a blockchain may specify an item with a 'car' type that has a 'status' attribute with potential values including: 'ordered, manufacturing, manufactured, transmit, dealer purchased, purchased, leased, rented, totaled, inoperative'.

Composite Keys

Attribute names and values associated with a digital representation of an item may be combined to create composite key values. A composite key value comprises at least one attribute name and corresponding attribute value of an item. A composite key value may comprise multiple attribute names and corresponding attribute values of an item. In one embodiment, a composite key value comprises a concatenated string of one or more attribute names and corresponding attribute values of an item.

Composite key values can be generated using smart contracts that are stored in one or more blocks of a blockchain. When a transaction or proposed block is received by a node, instruction-related data (i.e. a smart contract) stored in one or more blocks of a blockchain generates a composite key value based on one or more values within the proposed block. Alternatively, composite key values can be generated using instructions or logic that is stored in association with one or more nodes of a blockchain network.

For example, a proposed block may include a digital representation of a car item type with attributes and corresponding attribute values: 'item status:ordered', and 'vehicle type:commercial'. The composite key value for the car item may simply be 'item status:ordered'. The composite key may also be a combination of multiple attribute names and corresponding attribute values such as: 'item status:ordered, vehicle type:commercial'. Configurations of composite key values for each item type of a blockchain may configured by a blockchain system administrator.

Quorum Mappings

A composite-key-value-to-quorum-participants mapping provides data that indicates, for each composite key value, nodes of a blockchain network that are to be included in the validating quorum for blocks that contain transactions that correspond to the composite-key value. Thus, a composite-key-value-to-quorum-participants mapping maps composite key values to quorum-participants. The mapping may be stored as digital data in one or more blocks of a blockchain or may also be stored is an external datastore that is accessible by the blockchain network.

A composite-key-value-to-quorum-participants mapping may comprise a one-to-one or one-to-many mapping of composite key values to quorum-participants. For example, a composite-key-value-to-quorum-participants mapping may specify that the composite key: 'item status:ordered, vehicle type:commercial' is mapped to a node with ID:1 and a node with ID:5.

A blockchain network administrator may create and store a composite-key-value-to-quorum-participants mapping. For example, when a node is added to a blockchain network, the blockchain network or administrator of the blockchain network may assign item types and composite keys to the node. The assignments create the composite-key-value-to-quorum-participants mapping that indicates which nodes are eligible to validate transactions or proposed blocks that include items with the assigned item types and composite keys.

For example, a node with ID: 1 may be assigned the composite keys: 'item status:ordered, vehicle type:commercial' and 'item status:ordered, vehicle type:recreational' for the 'car' item type. The assignments are recorded in a composite-key-value-to-quorum-participants mapping which may be used to determine a quorum of nodes that must approve the validity of a proposed block before the proposed block is stored in a blockchain, as discussed herein.

As another example, a node with ID: 2 that is assigned to a 'junkyard' type may be mapped to the composite key: 'type:car, status:totaled' because a node with a 'junkyard' type is the best source of authority to know when cars are totaled. Similarly, a node with ID: 3 that is assigned to a 'DMV' type may be mapped to the composite key 'type:car, status:operational' because a node with a 'DMV' type is the best source of authority to know about the ownership of operational cars.

Adding a New Node to a Blockchain

When a new node is added to a blockchain network, the system or system admin(s) verify item types and composite keys that the node is eligible to validate. To be given validating authority on an item type and composite keys, a new node, or participant associated with the node, may participate in thorough security checks before the node is added to the blockchain network in order to keep the blockchain network secure. For example, if a node is associated with an individual user participant, the identity of the user must be verified by a variety of security checks which may include government ID, background check, government clearance check, etc. before being added to a blockchain network. As another example, if a node is associated with a system, server, or service such as PBS, UM, SHAW, etc., the digital identity of the service must be verified using techniques such as a digital certificate or handshake before being added to a blockchain network.

A node may have validating authority for one or more item types. In conjunction to having authority for item types, a node must have authority for composite keys of item types to be selected for a dynamic quorum.

Forming a Dynamic Quorum

When a proposed block that includes an item with a specific composite key is received by a node of a blockchain network, the receiving node uses the composite-key-value-to-quorum-participants mapping to dynamically form a validating quorum for the new block by identifying nodes with validating authority for the item type and specific composite key. The quorum-participants for the proposed block then either accept or reject the proposed block. A proposed block is stored as a block in a blockchain when all nodes in a validating quorum accept the proposed block.

A validating quorum can be determined using smart contracts that are stored in one or more blocks of a blockchain. When a transaction or proposed block is received by a node, instruction-related data stored in one or more blocks of a blockchain (i.e. a smart contract) dynamically determines a validating quorum using the composite-key-value-to-quorum-participants mapping and composite key value of the proposed block. Alternatively, a validating quorum can be determined using instructions or logic that is stored in association with one or more nodes of a blockchain network.

Dynamic Weighting

In an embodiment, a PoDQ consensus algorithm includes dynamic weighting. Using dynamic weighting, each node of a blockchain network or validating quorum is assigned a weight based on attributes of items included in a proposed block and attributes of the respective node. When the combined weights of the nodes that approve the proposed block or transaction exceed a threshold weight value, the proposed block is written to the blockchain.

Weights assigned to each node can be dynamically calculated using smart contracts that are stored in one or more blocks of a blockchain. When a transaction or proposed block is received by a node, instruction-related data stored in one or more blocks of a blockchain (i.e. a smart contract) generates a composite key value based on one or more values within the proposed block. The instruction-related data calculates weights for each node of a blockchain network or validating quorum based on the composite key value and attribute values of the respective node. A mapping may be stored in the blockchain that maps each node of a blockchain network to one or more attribute names and values. Alternatively, or additionally, logic may be stored that calculates a weight for a node based on comparing the composite key value to the one or more attribute names and values that are mapped to the node. The calculated weight of a node may be based on the amount of attribute values mapped to a node that match attribute values from the composite key value. For example, for a node that includes attribute values that match each attribute value included in the composite key value, the node may be given a maximum weight relative to other nodes. The smart contract may also indicate a threshold weight value that must be satisfied for the node to validate the proposed block.

As an example, a proposed block may be received by a node. The proposed block may include attribute names and values such as 'item status:ordered' and 'vehicle type: commercial'. The node may execute a smart contract that generate a composite key for the proposed block resulting in the composite key: 'item status:ordered, vehicle type:commercial'. The smart contract may further calculate a weight for each node in a blockchain network by comparing the composite key to attribute names and values associated with each respective node. By way of example, a weight of a first node may be '9', a weight of a second node may be '6', a weight of a third node may be '1'. If the smart contract indicates a threshold weight value of '11' must be satisfied for the node to validate the proposed block, the first node with weight '9' and second node with weight '6' must accept the proposed block in order to satisfy the threshold weight value of '11'. When the threshold weight value is satisfied, the receiving node validates the proposed block by writing the proposed block to the blockchain.

Dynamic weighting can be implemented with dynamic quorum techniques discussed above such that when a validating quorum is formed, each quorum-participant in the validating quorum is assigned a weight. If the weights of the quorum-participants that approve the proposed block or transaction exceeds a threshold weight value, then the proposed block is written to the blockchain.

Proof-of-Dynamic-Quorum Example

Figure 2:
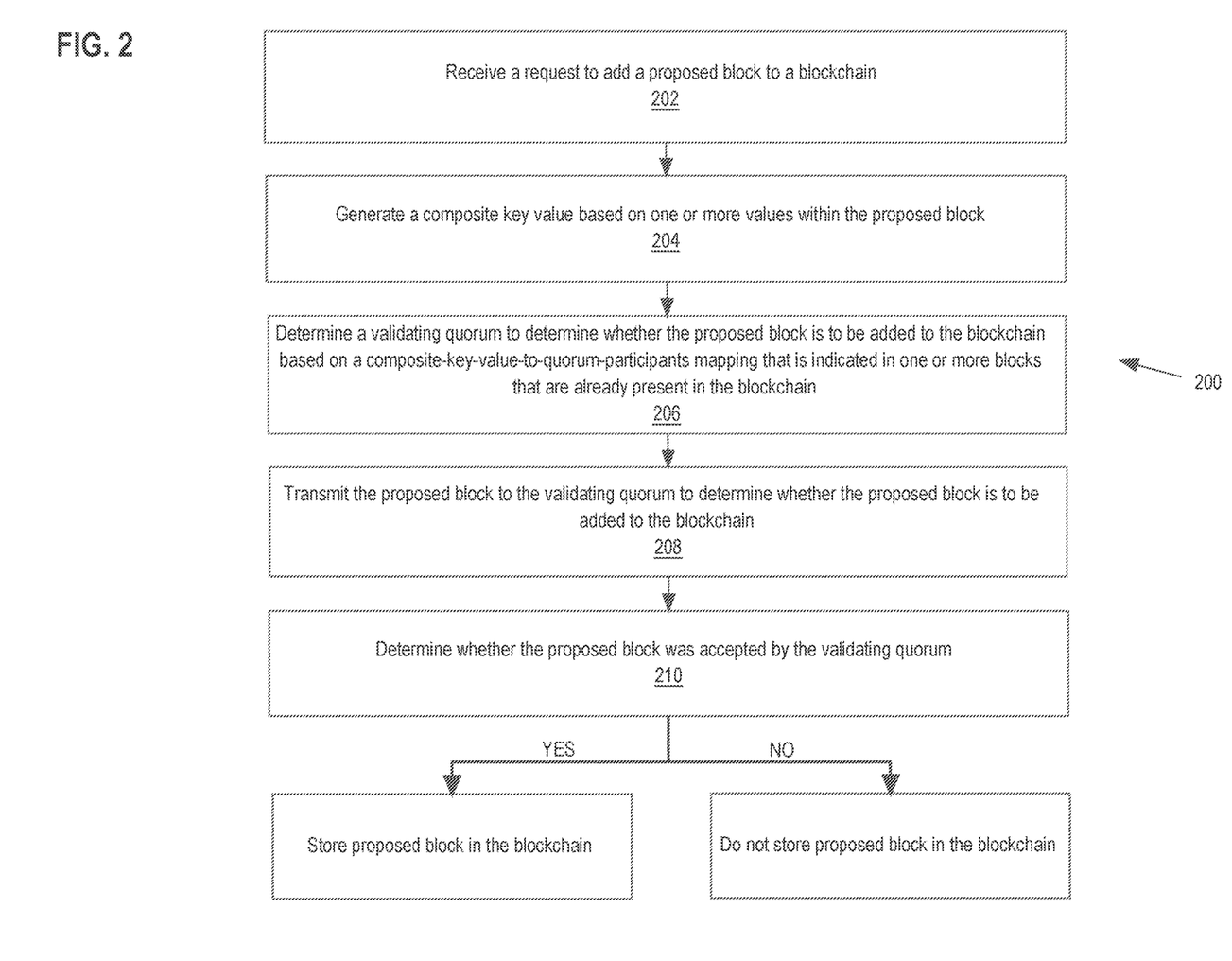
FIG. 2 depicts a method for providing a proof-of-dynamic-quorum consensus algorithm.

FIG. 2 depicts a method for providing an implementation of a proof-of-dynamic-quorum consensus algorithm, in an example embodiment. FIG. 2 is described at the same level of detail that is ordinarily used, by persons of skill in the art to which this disclosure pertains, to communicate among themselves about algorithms, plans, or specifications for other programs in the same technical field. While the algorithm or method of FIG. 2 shows a plurality of steps, the algorithm or method described herein may be performed using any combination of one or more steps of FIG. 2 in any order, unless otherwise specified.

For purposes of illustrating a clear example, FIG. 2 is described herein in the context of FIG. 1, but the broad principles of FIG. 2 can be applied to other systems having configurations other than as shown in FIG. 1. Further, FIG. 2 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 2 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

At step 202, a request is received to add a proposed block to a blockchain. In some embodiments, one or more transactions are received by a node of a plurality of nodes of a blockchain network. The node groups and records the one or more transactions as transaction entries into a proposed block. Each of the one or more transactions in the proposed block may include digital representations of items with one or more attribute values. For example, node 106 receives a transaction from computing device 114. Node 106 generates a proposed block that includes the transaction.

At step 204, a composite key value is generated based on one or more values within the proposed block. In one embodiment, the composite key value may be generated based on one or more attribute values of a transaction entry in the proposed block. The composite key value may be generated by concatenating attribute names and corresponding attribute values with other attribute names and corresponding attribute values from the transaction entry. For example, node 106 generates a composite key value using on one or more attribute values of a transaction entry in the proposed block.

At step 206, a validating quorum is determined. The validating quorum determines whether the proposed block is to be added to the blockchain. The validating quorum comprises one or more nodes of a blockchain network. The validating quorum is determined based on a composite-key-value-to-quorum-participants mapping that is indicated in one or more blocks that are already present in the blockchain. The composite-key-value-to-quorum-participants mapping maps composite key values to quorum participants. For example, node 106 stores one or more blocks in the blockchain that define a composite-key-value-to-quorum-participants mapping. Node 106 determines the validating quorum by identifying one or more nodes from the composite-key-value-to-quorum-participants mapping that are mapped to the composite key value generated in step 204.

At step 208, the proposed block is transmitted to the validating quorum to determine whether the proposed block is to be added to the blockchain. For example, node 106 transmits the proposed block to all nodes included in the validating quorum.

At step 210, it is determined whether the proposed block was accepted by the validating quorum. If it is determined that the proposed block was accepted by the validating quorum, the proposed block is stored in the blockchain. If it is determined that the proposed block was not accepted by the validating quorum, the proposed block is stored in the blockchain. In one embodiment, the proposed block is accepted by the validating quorum when each node in the validating quorum accepts the block. In another embodiment, the proposed block is accepted by the validating quorum when a majority of nodes in the validating quorum accepts the block. For example, node 106 receives an indication or message from node 104 and node 108 that the proposed block is valid. In response, node 106 stores the proposed block in the blockchain.

Proof of Dynamic Quorum Benefits

In certain example embodiments, a blockchain advantageously provides cryptographically safe storage and immutability for the records that are stored on the blockchain. The blockchain allows for a complete history of transactions (e.g., a chain of transactions). In certain example embodiments, cryptographic signing may be required or used to facilitate the request and performance of cloud service operations.

Since each block of a distributed blockchain contains a hash of the previous block before it, any unauthorized changes to data within the blockchain produces changes in the hash of each block in the chain. Therefore, unauthorized changes can easily be detected through the use of blockchains. Moreover, all changes to security service information are first approved by a consensus network of computers, which protects the integrity of the blockchain data.

The use of the blockchain allows for consensus confirmation of submitted transactions before they may be considered "committed" to the cryptographic ledger that is represented by the blockchain.

PoDQ techniques discussed herein provide enhancements to consensus confirmation by utilizing real-world authority data to select a custom quorum of nodes to accept the validity of proposed blocks. For practical applications, such as storing digital representations of real-world assets, certain entities may be more reliable sources of authority than others regarding specific transactions. For example, for a transaction regarding a transfer of ownership of a car asset between a manufacturer entity and a dealership entity, the manufacturer entity and dealership entity are likely the most accurate sources of authority regarding the validity of the transaction, since they are the two entities who are participating in the actual real-world transaction. In contrast, a junkyard entity or car maintenace entity may be related to the car asset, but in reality have no actual knowledge or authority of the real-world transaction regarding the asset.

In other consensus algorithms, nodes that have no authoritative relation to real-world assets that are represented by digital data stored in a blockchain may be chosen to validate proposed blocks that include such data. PoDQ provides an additional layer of security to traditional blockchain implementations by filtering out nodes that have no authoritative relation to transactions included in proposed blocks and only allowing the most authoritative nodes of a blockchain network of nodes to validate proposed blocks that include specific attributes and attribute values.

PoDQ enables item specific securitization by providing functionality to provide a highly authoritative validating quorum to determine the validity of transactions that include digital representation of items. Further, types and attributes of items are considered by PoDQ techniques discussed herein to dynamically provide a validating quorum for each different type and attribute configuration of a digitally represented item. Thus, security for digital representations of real-world items are enhanced using techniques discussed herein.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
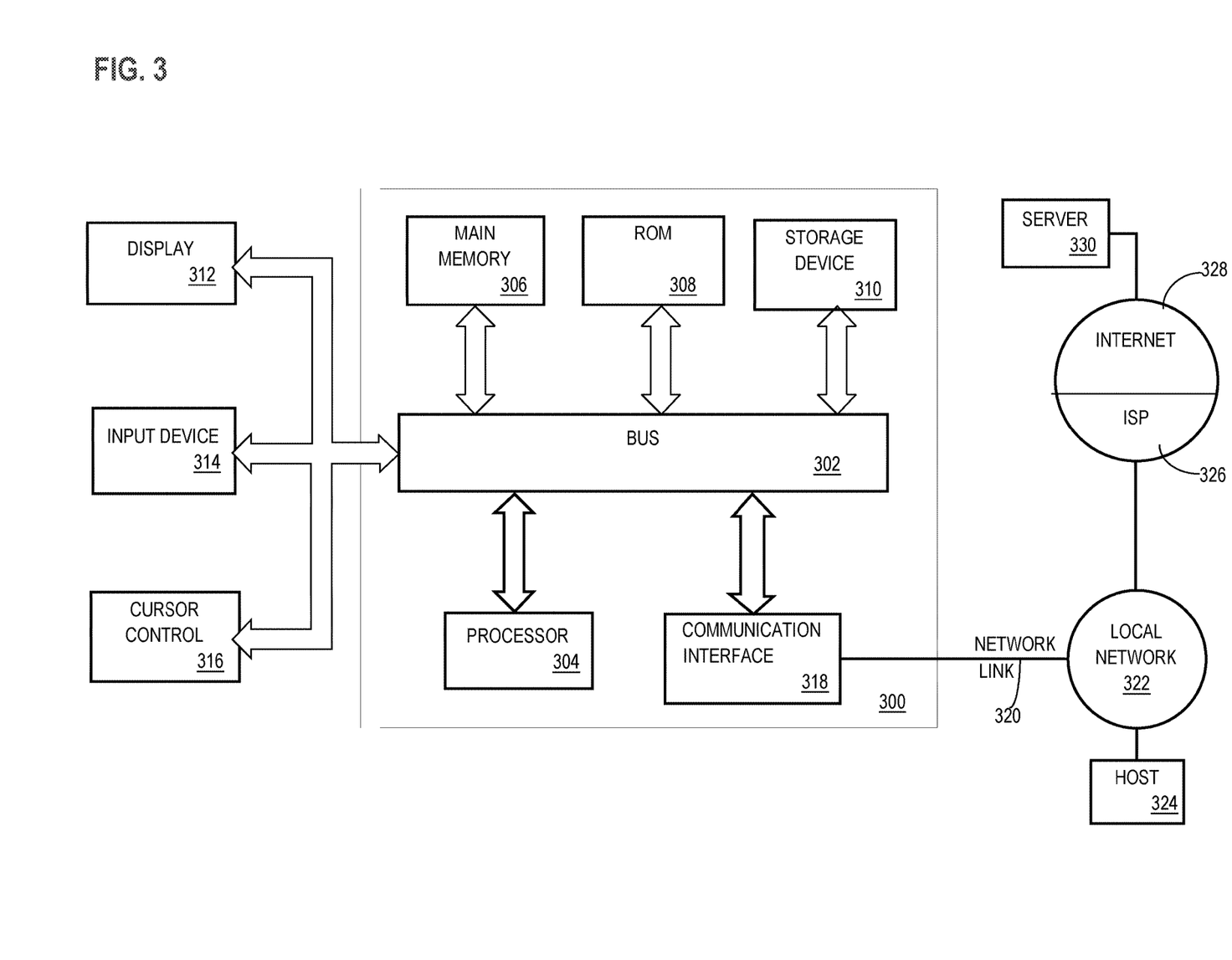
FIG. 3 depicts a computer system upon which an embodiment of the invention may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method for determining quorum-participantsto decide whether a proposed block is to be added to a blockchain that is maintained by a blockchain network that comprises a plurality of nodes, comprising:
    generating a composite key value based on one or more attribute values of a transaction entry within the proposed block;
    wherein the transaction entry includes one or more items involved in a transaction, the one or more items including the one or more attribute values;
    based on a composite-key-value-to-quorum-participants mapping that is indicated in one or more blocks that are already present in the blockchain, determining a validating quorum to determine whether the proposed block is to be added to the blockchain;
    wherein determining the validating quorum includes selecting a subset of nodes, from the plurality of nodes, based on the subset of nodes being mapped to the composite key value generated for the proposed block;
    receiving an indication from the validating quorum that indicates whether the proposed block was accepted to be added to the blockchain by the validating quorum.

2. The method of claim 1, wherein the proposed block comprises one or more transaction entries, each of the one or more transaction entries indicating a transaction that affects an item comprising one or more attribute values.

3. The method of claim 1, wherein generating the composite key value based on the one or more attribute values of the transaction entry within the proposed block includes combining the one or more attribute values and corresponding names of the one or more attribute values into a single composite key value.

4. The method of claim 1, wherein the composite-key-value-to-quorum-participants mapping maps composite key values to one or more nodes of the plurality of nodes of the blockchain network.

5. The method of claim 1, further comprising:
    receiving a request to add the proposed block to the blockchain;
    transmitting the proposed block to the validating quorum to determine whether the proposed block is to be added to the blockchain.

6. The method of claim 5, further comprising:
    determining, based on the indication, that the proposed block was accepted to be added to the blockchain by the validating quorum and in response, storing the proposed block in the blockchain.

7. The method of claim 5, further comprising:
    determining, based on the indication, that the proposed block was not accepted to be added to the blockchain by the validating quorum and in response, rejecting storing the proposed block in the blockchain.

8. The method of claim 1, further comprising:
    calculating weight values for each node of the validating quorum based on the composite key value and one or more values associated with each respective node of the validating quorum;
    determining that a cumulative total of weight values of nodes of the validating quorum that accepted the proposed block satisfies a threshold weight value and in response, storing the proposed block in the blockchain.

9. One or more non-transitory computer-readable media storing instructions for determining quorum-participants to decide whether a proposed block is to be added to a blockchain that is maintained by a blockchain network that comprises a plurality of nodes, comprising:
    generating a composite key value based on one or more attribute values of a transaction entry within the proposed block;
    wherein the transaction entry includes one or more items involved in a transaction, the one or more items including the one or more attribute values;
    based on a composite-key-value-to-quorum-participants mapping that is indicated in one or more blocks that are already present in the blockchain, determining a validating quorum to determine whether the proposed block is to be added to the blockchain;
    wherein determining the validating quorum includes selecting a subset of nodes, from the plurality of nodes, based on the subset of nodes being mapped to the composite key value generated for the proposed block;
    receiving an indication from the validating quorum that indicates whether the proposed block was accepted to be added to the blockchain by the validating quorum.

10. The one or more non-transitory computer-readable media of claim 9, wherein the proposed block comprises one or more transaction entries, each of the one or more transaction entries indicating a transaction that affects an item comprising one or more attribute values.

11. The one or more non-transitory computer-readable media of claim 9, wherein generating the composite key value based on the one or more attribute values of the transaction entry within the proposed block includes combining the one or more attribute values and corresponding names of the one or more attribute values into a single composite key value.

12. The one or more non-transitory computer-readable media of claim 9, wherein the composite-key-value-to-quorum-participants mapping maps composite key values to one or more nodes of the plurality of nodes of the blockchain network.

13. The one or more non-transitory computer-readable media of claim 9, further comprising instructions for:
  receiving a request to add the proposed block to the blockchain;
  transmitting the proposed block to the validating quorum to determine whether the proposed block is to be added to the blockchain.

14. The one or more non-transitory computer-readable media of claim 13, further comprising instructions for:
  determining, based on the indication, that the proposed block was accepted to be added to the blockchain by the validating quorum and in response, storing the proposed block in the blockchain.

15. The one or more non-transitory computer-readable media of claim 13, further comprising instructions for:
  determining, based on the indication, that the proposed block was not accepted to be added to the blockchain by the validating quorum and in response, rejecting storing the proposed block in the blockchain.

16. The one or more non-transitory computer-readable media of claim 9, further comprising instructions for:
  calculating weight values for each node of the validating quorum based on the composite key value and one or more values associated with each respective node of the validating quorum;
  determining that a cumulative total of weight values of nodes of the validating quorum that accepted the proposed block satisfies a threshold weight value and in response, storing the proposed block in the blockchain.

* * * * *

UNITED STATES PATENT AND TRADEMARK OFFICE
CERTIFICATE OF CORRECTION

| | | |
|---|---|---|
| PATENT NO. | : 11,329,800 B2 | |
| APPLICATION NO. | : 16/658118 | |
| DATED | : May 10, 2022 | |
| INVENTOR(S) | : Hyunsuk Han et al. | |

It is certified that error appears in the above-identified patent and that said Letters Patent is hereby corrected as shown below:

In the Claims

Column 15 Claim 1 Lines 49-50: Delete "quorum-participantsto" and insert --quorum-participants to--.

Signed and Sealed this
Seventh Day of June, 2022

Katherine Kelly Vidal
*Director of the United States Patent and Trademark Office*